(12) United States Patent
Boogers

(10) Patent No.: US 7,523,698 B2
(45) Date of Patent: Apr. 28, 2009

(54) BRINE DEVICE

(75) Inventor: George Lambertus Josephus Maria Boogers, Uden (NL)

(73) Assignee: CFS Bakel B.V., Bakel (NL)

( * ) Notice: Subject to any disclaimer, the term of this patent is extended or adjusted under 35 U.S.C. 154(b) by 461 days.

(21) Appl. No.: 11/337,977

(22) Filed: Jan. 23, 2006

(65) Prior Publication Data

US 2006/0207443 A1 Sep. 21, 2006

(30) Foreign Application Priority Data

Jan. 24, 2005 (NL) .................................. 1028104

(51) Int. Cl.
*B02C 11/08* (2006.01)
*B02B 3/12* (2006.01)
*A23B 4/28* (2006.01)
(52) U.S. Cl. .............................. 99/532; 99/533; 99/535; 222/485; 426/264; 426/281
(58) Field of Classification Search ........................ None
See application file for complete search history.

(56) References Cited

U.S. PATENT DOCUMENTS

| | | | | |
|---|---|---|---|---|
| 2,796,017 | A | | 6/1957 | Schmidt |
| 3,035,508 | A | * | 5/1962 | Nelson .................. 144/250.18 |
| 3,590,721 | A | | 7/1971 | Hoffmann |
| 3,695,166 | A | * | 10/1972 | Hoffmann ..................... 99/489 |
| 4,437,397 | A | * | 3/1984 | Kawai .......................... 99/533 |
| 4,690,046 | A | * | 9/1987 | Corominas .................... 99/533 |
| 6,513,423 | B2 | * | 2/2003 | Thomas ........................ 99/533 |
| 6,658,990 | B1 | * | 12/2003 | Henning et al. ............... 99/533 |
| 2002/0117059 | A1 | * | 8/2002 | Thomas ........................ 99/532 |
| 2004/0237804 | A1 | * | 12/2004 | Corominas .................... 99/532 |
| 2005/0268796 | A1 | * | 12/2005 | Townsend ..................... 99/533 |

FOREIGN PATENT DOCUMENTS

CH 498 577 12/1970

* cited by examiner

*Primary Examiner*—Joseph M Pelham
(74) *Attorney, Agent, or Firm*—The Webb Law Firm

(57) ABSTRACT

A device for introducing a liquid, such as brine, into an animal product, such as meat, ham and the like, comprises a mounting member on which the product can be arranged and a holder at some distance from the mounting member. The holder bears hollow needles oriented transversely with respect to the mounting member and can move to and fro transversely to the mounting member for inserting the needles into the product or, alternatively, for extracting the needles from the product. Said needles have at least one discharge orifice near their free end and one feed orifice at some distance from said free end and are accommodated in the holder such that they can be displaced in the longitudinal direction between a position projecting relatively far out of the holder, in which the feed orifices are blocked, and a position projecting relatively less far out of the holder, in which the feed orifices have a flow connection to a liquid supply. In addition, locking means are provided for locking the needles in their position projecting relatively less far out of the holder.

16 Claims, 4 Drawing Sheets

BRINE DEVICE

The invention relates to a device for introducing a liquid, such as brine, into meat, fish and poultry. The device can also be used for introducing other liquids, such as a sugar solution into fruit. The device comprises a mounting member on which the product can be arranged, a holder at some distance from the mounting member, which holder bears a multiplicity of hollow needles oriented transversely with respect to the mounting member and which holder can move to and fro transversely to the mounting member for inserting the needles into the product or, alternatively, for extracting the needles from the product, which needles have at least one discharge orifice near their free end and one feed orifice at some distance from said free end, which needles are accommodated in the holder such that they can be displaced in the longitudinal direction between a position projecting relatively far out of the holder, in which the feed orifices are blocked, and a position projecting relatively less far out of the holder, in which the feed orifices have a flow connection to a liquid supply.

A device of this type kind is known. When the holder moves towards the mounting member, certain needles come into contact with and then enter the product, depending on the shape and dimensions thereof. Owing to the force exerted on said needles with this movement, they are displaced into the position in which the feed orifices become free. As a result, the liquid, such as brine, can flow via the needles inserted into the product towards and ultimately into the product itself. However, the other needles which have not been inserted into the product remain closed to the liquid, so no liquid flows away unused. As soon as the holder is withdrawn, the needles move to their position projecting relatively far out because the product initially prevents the needles inserted therein from moving back with the holder. Consequently, the feed orifices become closed off and the needles do not move out of the product with the holder until after this.

Such an approach is disadvantageous because with this procedure less liquid can be introduced into the product per unit of time. After all, feed of liquid is in fact blocked for approximately half the duration of a cycle, while the needles are being withdrawn. This results in less efficient use of the device and a longer processing time for products.

As an alternative, the needles can also all be pushed in advance into the position projecting relatively far out. The disadvantage of this, however, is that a great deal of liquid has to be circulated for this.

The aim of the invention is therefore to provide a device of the type described above which does not have these disadvantages. This aim is achieved in that locking means are provided for locking the needles in their position projecting relatively less far out of the holder.

The device according to the invention has the advantage not only that only the needles that have been inserted into the product deliver liquid, but also that these needles do this both when these needles are being pushed into the product and when they are being extracted from the product. Consequently, the production cycle is shorter.

The locking means can be implemented in many different ways. In particular the locking means can comprise a multiplicity of locking members, each of which locking members can be alternated between interacting with and not interacting with an associated needle. For this purpose each needle can be made with a shoulder and each locking member with a lobe. In the position where the needle projects relatively far out, this lobe is located next to the shoulder. In the position where the needle projects relatively less far out the shoulder rests on the side of the lobe facing away from the needle.

According to a preferred embodiment the lobe is provided at the free end of a resilient arm. With this arrangement, in the position where the needle projects relatively far out the lobe is held under spring pretension in contact with and next to the shoulder, in such a way that in the position where the needle projects relatively less far out the shoulder moves over the side of the lobe facing away from the needle under the influence of this spring pretension.

In a very stable embodiment each locking member can comprise a pair of resilient arms, each of which bears a lobe on either side of the shoulder of the associated needle. The resilient arms with lobe all form part of a plate, which plate has recesses in which there is in each case one pair of arms with lobes. Such an embodiment has the advantage of simplicity, because all the components can be implemented as an integrated whole.

The plate can be moved to and fro transversely to the needles between a locking position, in which the lobes are in contact with the shoulders underneath or to the side, and a release position, in which the lobes are located at some distance to the side of the shoulders.

A head is preferably provided on the shoulders; at some distance above the heads a stop member is situated in such a way that the heads are in contact with the stop member in the position where the needles project relatively less far out.

The stop member can be moved between a stop position for defining the position where the needles project relatively less far out and a pushing position closer to the holder for returning the needles to the position projecting relatively far out in the release position of the locking means.

The holder can also be implemented in different ways. The holder preferably comprises a chamber that is delimited by two walls extending next to one another. The chamber furthermore has a liquid inlet and the needles each extend through both walls in a sealed manner, in such a way that in the position where each needle projects relatively less far out there is a flow connection between the feed orifice and the chamber and in the position where each needle projects relatively far out there is no flow connection between the feed orifice and the chamber.

Each needle is fed through a pair of sealing rings in the pair of walls and protrudes with respect to one of the walls of the chamber. The shoulders and locking members are each located outside the other wall. These shoulders can be constituted by a broadened head of the needles. The plate can be slid along the other wall facing away from the needles.

The invention will be explained in more detail below with reference to an illustrative embodiment shown in the figures.

Figure 1:
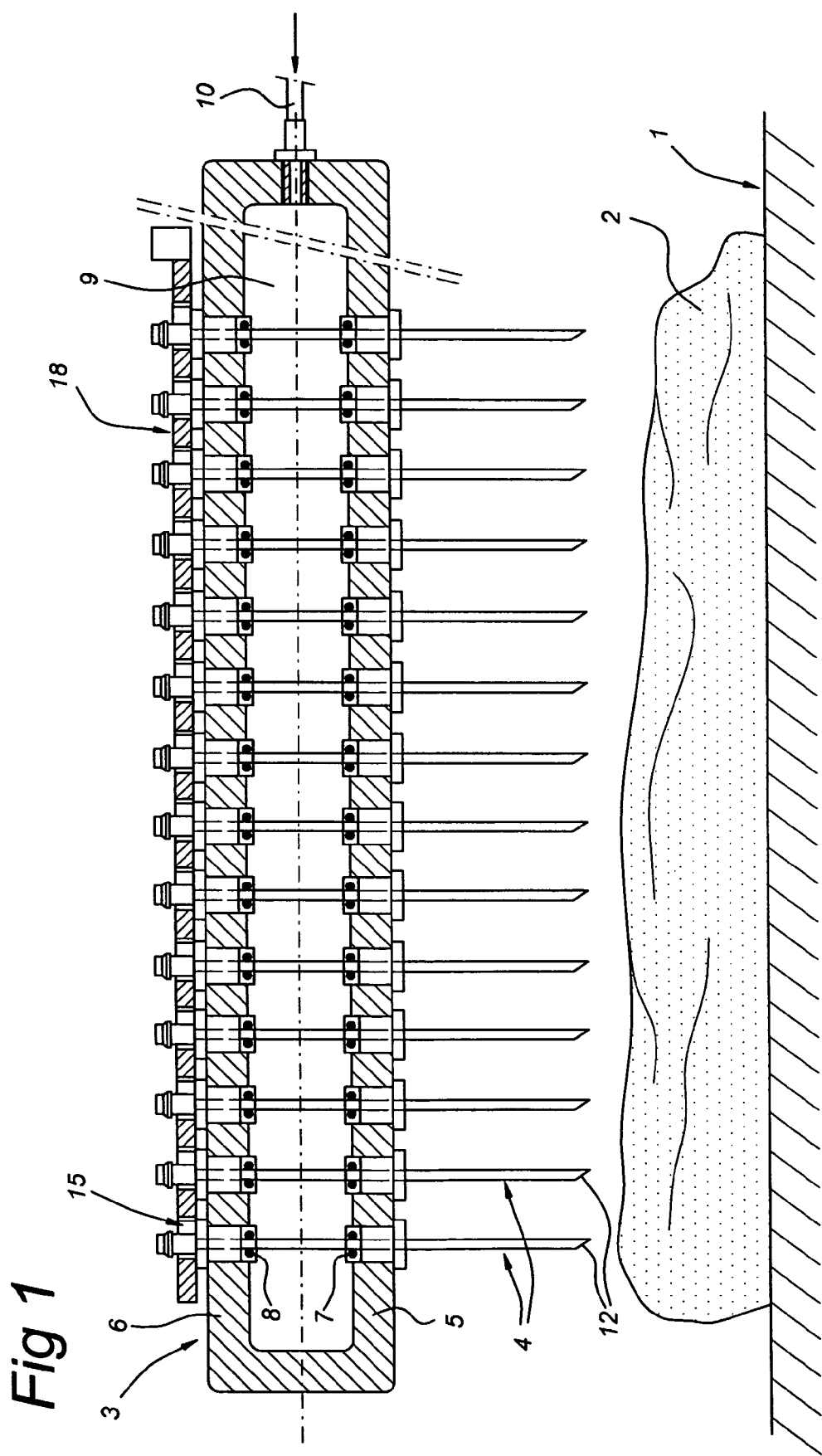
FIG. 1 shows diagrammatically a cross-section through a device according to the invention.

The device shown in cross-section in FIG. 1 for introducing a liquid comprises a mounting member 1 on which a meat product 2 is located. The holder, indicated by 3 and from the underside of which a multiplicity of hollow needles 4 projects, is positioned above said mounting member 1. The holder 3 has a lower wall 5 and an upper wall 6, through which the needles are directed via sealing rings 7, 8, respectively:

see also FIGS. 4a to d. Between the walls 5, 6 of the holder 3 there is a chamber 9, to which a liquid, such as brine, can be fed via the liquid supply 10.

For introduction of the liquid into the meat product 2, the holder 3 is moved in its entirety downwards in the direction of the mounting member 1. The needles 4 are then in the position shown in FIG. 4a In this position the feed orifice 11, which gives access to the interior of the hollow needles, is situated just past the bottom sealing ring 7 with respect to the chamber 9. Consequently, the liquid cannot penetrate into the hollow needles 4 from the chamber 9.

Figure 4A:
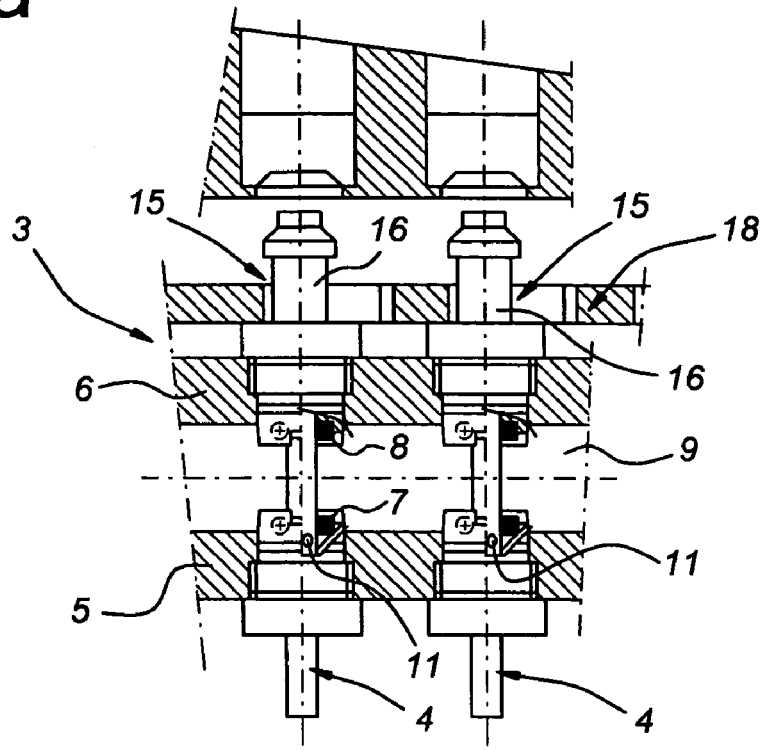
FIGS. 4a to 4d show different positions of the needles when liquid is being introduced into the product.
Figure 4B:
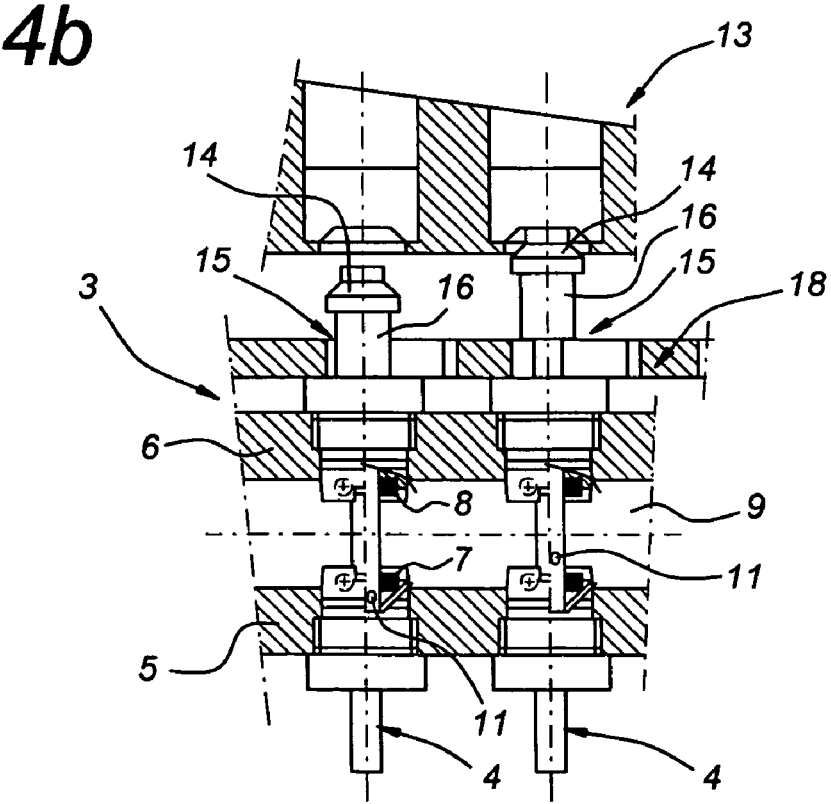

As soon as one or more needles 4 come into contact with the meat product 2, they are pushed up slightly with respect to the holder 3, as shown in the case of the right-hand needle 4 in FIG. 4b. There is then a flow connection between the feed orifice 11 and the chamber 9, such that the liquid can flow towards the discharge orifices 12 at the bottom of the needles 4. At this point, introduction of the liquid into the meat product 2 begins. Of importance is the fact that the needles 4 which are not in contact with the meat product remain closed so that no liquid is lost. Apart from that, the upwards movement of the needles 4 is limited by the stop member, indicated in its entirety by 13, against which the head 14 of the needle 4 strikes.

Once the needles 4 have penetrated into the meat product 2 over the desired length, the holder 3 is moved up again. As a result of the friction which the meat product 2 exerts on the needles 4, the needles 4 should consequently be pulled down again with respect to the holder 3, with the result that the feed orifices 11 close because they pass the bottom sealing rings 7. However, this is undesirable, because then no liquid can be introduced into the meat product during the ascending part of the cycle of inserting and removing the needles 4.

Figure 2:
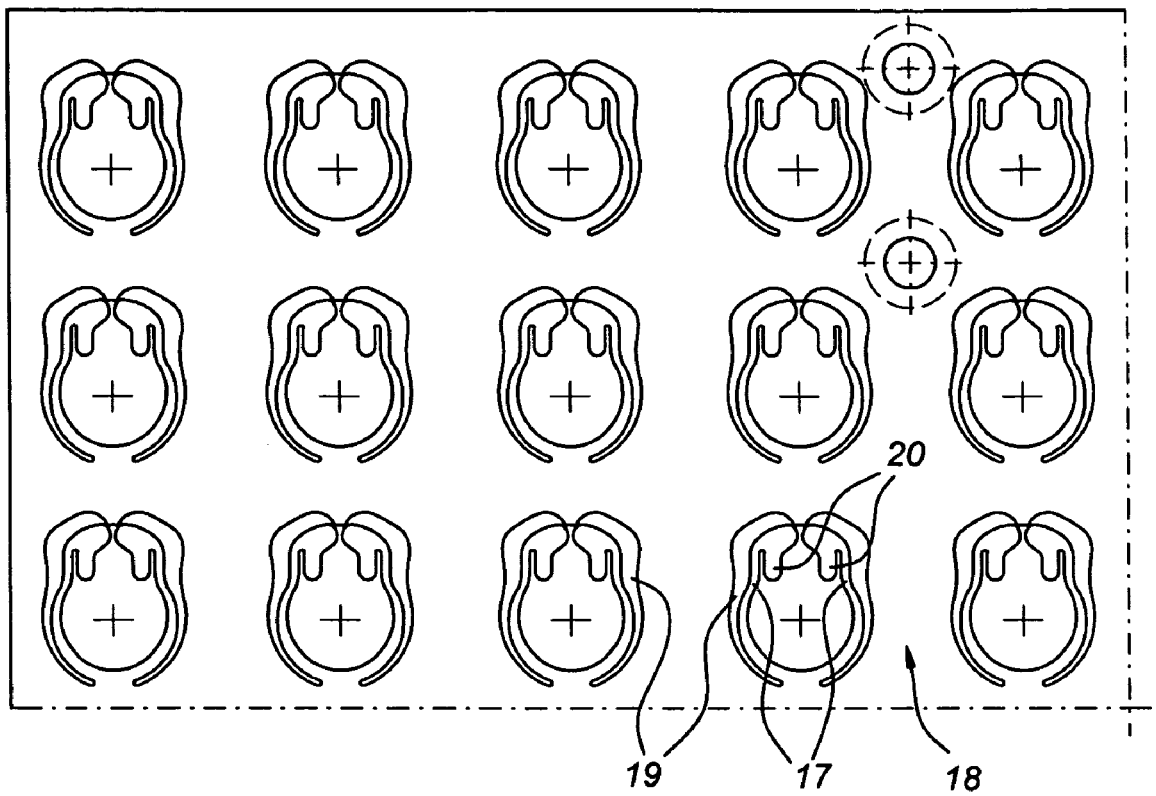
FIG. 2 shows diagrammatically a plan view of the locking plate as used in the device according to FIG. 1.

According to the invention, the locking means, indicated in their entirety by 15, are provided in order to make feeding of liquid to the meat product possible even when the holder 3 with needles 4 is being moved upwards. Each needle 4 has its own locking means 15. These locking means 15 comprise first of all a shoulder 16 that is located near the head 14. The locking means 15 furthermore comprise a pair of resilient arms 17, which form one entity with a locking plate 18: see FIGS. 2, 3a and 3b. The resilient locking arms 17 are located in particular in recesses 19 in the locking plate 18. The lobes 20 are located at the free end of the resilient arms 17.

Figure 3A:
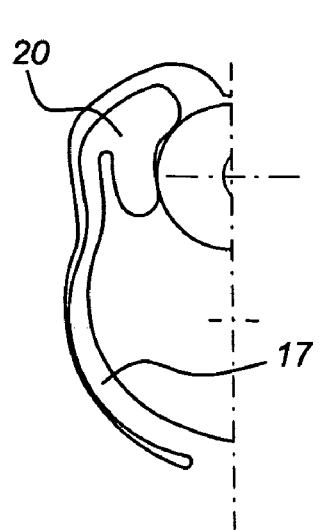
FIGS. 3a and 3b show the unlocked and locked state, respectively, of the locking members of the locking plate according to FIG. 2.
Figure 3B:
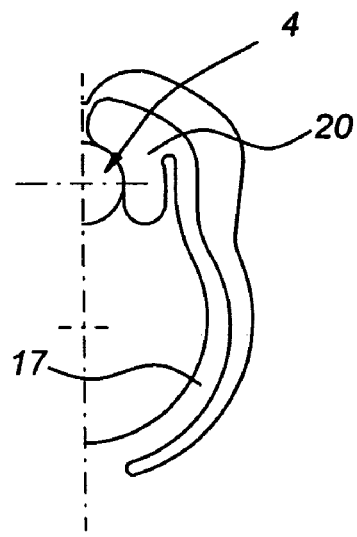

In the situation shown in FIG. 3a, associated with the left-hand needle in FIG. 4b, the lobe 20 is in contact with the side of the shoulder 16. The locking means are then inoperative.

In the case of the right-hand needle 4 in FIG. 4b it is different. The shoulder 16 is then moved upwards until it is past the lobe 20. As soon as this is the case, the lobe 20 moves under the influence of the spring pretension exerted by the resilient arms 17 towards and against the outer periphery of the needle 4, which has a smaller diameter than the shoulder 16. The result of this is that the lobe 20 reaches a position underneath the shoulder 16 and the needle 4 is locked against being moved downwards. As a result of this locking, the needle 4 remains in this position moved upwards with respect to the holder 3, so liquid can be introduced into the meat product even when the needle 4 is being withdrawn from the meat product 2. After all, there is still a flow connection between feed orifice 11 and the chamber 9.

Figure 4C:
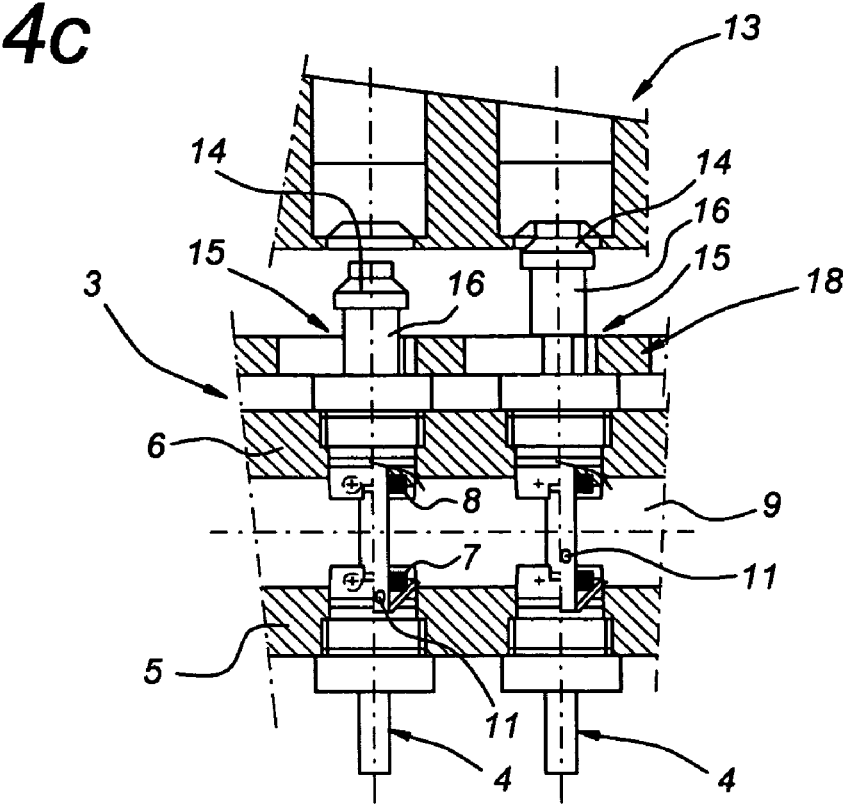
Figure 4D:
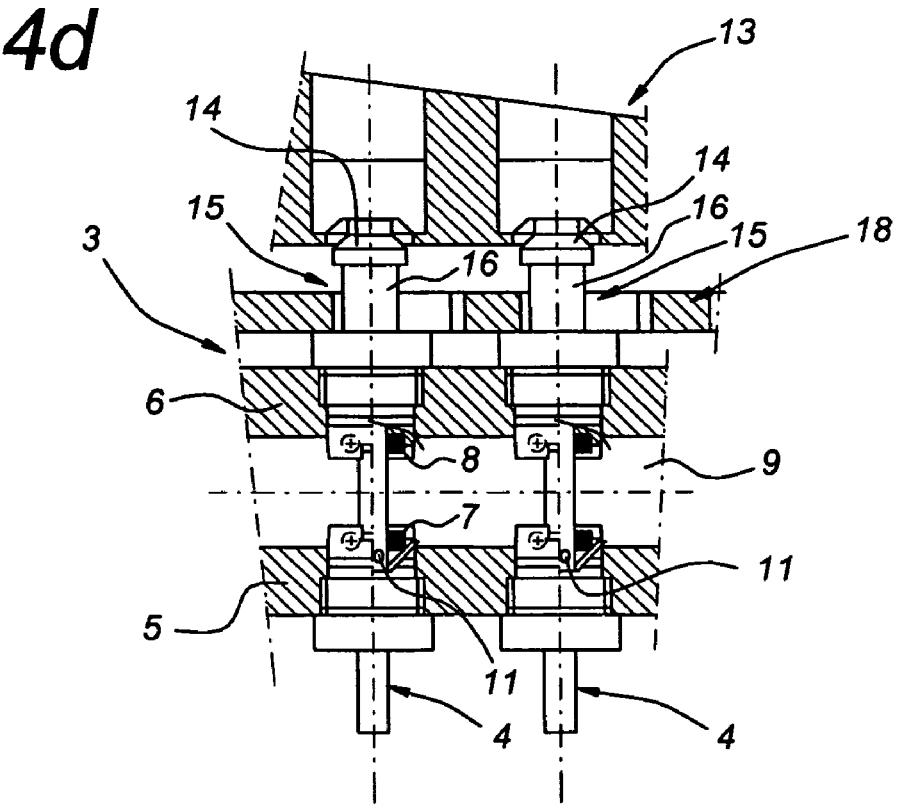

After the needles have been extracted from the meat product 2, the plate 18 is slid as shown in FIG. 4c. As a result, the lobes 20 move out from under the shoulders 16, after which the stop member 13 is moved downwards. This stop member 13 presses on the head 14 of the needles 4, which are then transferred again into a position projecting relatively far out. In this situation the feed orifices 11 are again closed off with respect to the chamber 9 and liquid can no longer escape.

The invention claimed is:

1. A device for introducing a liquid into an animal product, comprising: a mounting member on which the product can be arranged, a holder at some distance from the mounting member, which holder bears a multiplicity of hollow needles directed toward the mounting member and which holder can move to and fro with respect to the mounting member for inserting the needles into the product or for extracting the needles from the product, which needles have at least one discharge orifice near a free end and one feed orifice at some distance from said free end, which needles are accommodated in the holder such that they can be displaced in the longitudinal direction between a position projecting relatively far out of the holder, in which the feed orifices are blocked, and a position projecting relatively less far out of the holder, in which the feed orifices have a flow connection to a liquid supply, wherein locking means are provided for locking the needles in their position projecting relatively less far out of the holder.

2. The device according to claim 1, wherein the locking means comprise a multiplicity of locking members, each of which locking members can be alternated between interacting with and not interacting with an associated needle.

3. The device according to claim 2, wherein each needle has a shoulder and each locking means has at least one lobe, which lobe is located next to the shoulder in the position where the needle projects relatively far out and which shoulder rests on the side of the lobe facing away from the needle in the position wherein the needle projects relatively less far out.

4. The device according to claim 3, wherein the lobe is provided at the free end of a resilient arm and in the position of the needle sticking relatively far out is held under spring pretension in contact with and next to the shoulder and in the position where the needle projects relatively less far out the shoulder moves over the side of the lobe facing away from the needle under the influence of this spring pretension.

5. The device according to claim 4, wherein each locking member comprises a pair of resilient arms, each of which bears a lobe on either side of or underneath the shoulder of the associated needle.

6. The device according to claim 5, wherein the resilient arms with lobe all form part of a plate, which plate has recesses in which one pair of arms with lobes is located in each case.

7. The device according to claim 6, wherein the plate can be moved to and fro transversely to the needles between a locking position, in which the lobes are in contact with the shoulders underneath or to the side, and a release position, in which the lobes are located at some distance to the side of the shoulders.

8. The device according to claim 7, wherein a head is provided on the shoulders and there is a stop member at some distance above the heads, which heads are in contact with the stop member in the position where the needles project relatively less far out.

9. The device according to claim 8, wherein the stop member can be moved up and down between a stop position for defining the position where the needles project relatively less far out and a pushing position closer to the holder for returning the needles to the position projecting relatively far out in the release position of the locking means.

10. The device according to claim 1, wherein the holder comprises a chamber that is delimited by two walls extending next to one another, which chamber has a liquid inlet, and the needles each extend through both walls in a sealed manner, in such a way that in the position where each needle projects relatively less far out there is a flow connection between the feed orifice and the chamber and in the position where each needle projects relatively far out there is no flow connection between the feed orifice and the chamber.

11. The device according to claim 10, wherein each needle is fed through a pair of sealing rings in the pair of walls.

12. The device according to claim 10, wherein each needle protrudes with respect to one of the walls of the chamber and each shoulder and each locking member is located outside the other wall.

13. The device according to claim 12, wherein the shoulders are each constituted by a broadened head of the needle.

14. The device according to claim 6, wherein the holder comprises a chamber that is delimited by two walls extending next to one another, which chamber has a liquid inlet, and the needles each extend through both walls in a sealed manner, in such a way that in the position where each needle projects relatively less far out there is a flow connection between the feed orifice and the chamber and in the position where each needle projects relatively far out there is no flow connection between the feed orifice and the chamber.

15. The device according to claim 14, wherein each needle protrudes with respect to one of the walls of the chamber and each shoulder and each locking member is located outside the other wall and wherein the plate can be slid along the other wall facing away from the needles.

16. The device according to claim 14, wherein the shoulders are each constituted by a broadened head of the needle.

* * * * *